(12) United States Patent
Marien

(10) Patent No.: US 9,922,509 B2
(45) Date of Patent: Mar. 20, 2018

(54) STROBE NOTIFICATION APPLIANCE WITH DIRECTIONAL INFORMATION

(71) Applicant: Tyco Fire & Security GmbH, Neuhausen am Rheinfall (CH)

(72) Inventor: Bruce Marien, Gardner, MA (US)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 0 days.

(21) Appl. No.: 15/004,420

(22) Filed: Jan. 22, 2016

(65) Prior Publication Data
US 2017/0213429 A1  Jul. 27, 2017

(51) Int. Cl.
  *G08B 5/22*   (2006.01)
  *G08B 5/38*   (2006.01)
  *G08B 7/06*   (2006.01)
  *G09B 21/00*  (2006.01)

(52) U.S. Cl.
  CPC .............. *G08B 5/38* (2013.01); *G08B 7/062* (2013.01); *G09B 21/009* (2013.01)

(58) Field of Classification Search
  None
  See application file for complete search history.

(56) References Cited

U.S. PATENT DOCUMENTS

| 5,559,492 | A | 9/1996 | Stewart et al. |
| 5,622,427 | A | 4/1997 | Lemons et al. |
| 5,865,527 | A | 2/1999 | Lemons et al. |
| 6,310,551 | B1* | 10/2001 | Croft ...................... A61G 1/007 116/51 |
| 8,723,682 | B2 | 5/2014 | Savage, Jr. |
| 8,773,276 | B2 | 7/2014 | Savage, Jr. |
| 8,796,931 | B2 | 8/2014 | Savage, Jr. |
| 8,845,136 | B2 | 9/2014 | Savage, Jr. et al. |
| 8,890,707 | B2 | 11/2014 | Savage, Jr. |
| 8,890,708 | B2 | 11/2014 | Savage, Jr. |
| 9,185,774 | B2 | 11/2015 | Savage, Jr. |
| 9,345,082 | B2 | 5/2016 | Savage, Jr. |
| 9,355,535 | B2 | 5/2016 | Savage, Jr. |
| 9,466,186 | B2 | 10/2016 | Savage, Jr. |
| 2005/0073405 | A1* | 4/2005 | Spoltore ................ G08B 7/062 340/506 |
| 2006/0038696 | A1* | 2/2006 | Arcaria .................... G08B 3/10 340/691.3 |
| 2007/0069882 | A1* | 3/2007 | Mahajan ............... E05B 65/104 340/500 |

(Continued)

*Primary Examiner* — Curtis King
(74) *Attorney, Agent, or Firm* — Brinks Gilson & Lione

(57) ABSTRACT

A strobe notification appliance that outputs directional information is disclosed. The strobe notification appliance may generate, in addition to notification of the fire condition, directional information (e.g., such as away from the unavailable exit paths and/or toward the preferred exit paths). In one instance, the strobe notification appliance includes a strobe element (such as a flash tube strobe element or LED strobe element) outputting fire notification information and a directional light element (such as one or more LEDs) outputting directional information. In another instance, the strobe notification appliance includes the strobe element that outputs both fire notification information and directional information. In this way, occupants of a building may be notified of a fire and notified of available or unavailable exit paths.

21 Claims, 11 Drawing Sheets

(56) References Cited

U.S. PATENT DOCUMENTS

| | | | |
|---|---|---|---|
| 2008/0022414 A1* | 1/2008 | Cahn | H04L 9/3236 726/28 |
| 2009/0027225 A1* | 1/2009 | Farley | G08B 7/06 340/6.11 |
| 2009/0059602 A1* | 3/2009 | Santos | G08B 7/06 362/351 |
| 2010/0207777 A1* | 8/2010 | Woodford | G08B 5/38 340/815.45 |
| 2012/0238319 A1* | 9/2012 | Lake | G08B 7/06 455/556.1 |
| 2012/0319860 A1* | 12/2012 | Savage, Jr. | G08B 7/06 340/691.8 |
| 2013/0049985 A1* | 2/2013 | Eisenson | G08G 1/0965 340/902 |
| 2013/0194063 A1* | 8/2013 | Keller | G08B 7/06 340/4.21 |
| 2014/0009301 A1* | 1/2014 | Robotham | G08B 5/38 340/691.1 |
| 2015/0339913 A1* | 11/2015 | Lyman | G08B 25/12 340/287 |
| 2016/0035200 A1 | 2/2016 | Savage, Jr. et al. | |
| 2016/0035201 A1* | 2/2016 | Savage, Jr. | G08B 17/00 340/815.45 |
| 2016/0049053 A1* | 2/2016 | Simmons | G01C 21/206 340/815.4 |
| 2016/0247369 A1* | 8/2016 | Simmons | G08B 7/062 |

* cited by examiner

STROBE NOTIFICATION APPLIANCE WITH DIRECTIONAL INFORMATION

BACKGROUND

Fire alarm devices such as audible horns (audible/visible or A/V), loudspeakers (speaker/visible or SN) and visible strobes (visible only or V/O), are referred to as "notification appliances." Typically, a fire alarm control panel (FACP) drives these devices over one or more "notification appliance circuits" (NACs). The strobes are used, for example, as an alert for the hearing-impaired, or for those in a high noise environment.

DETAILED DESCRIPTION

Figure 1:
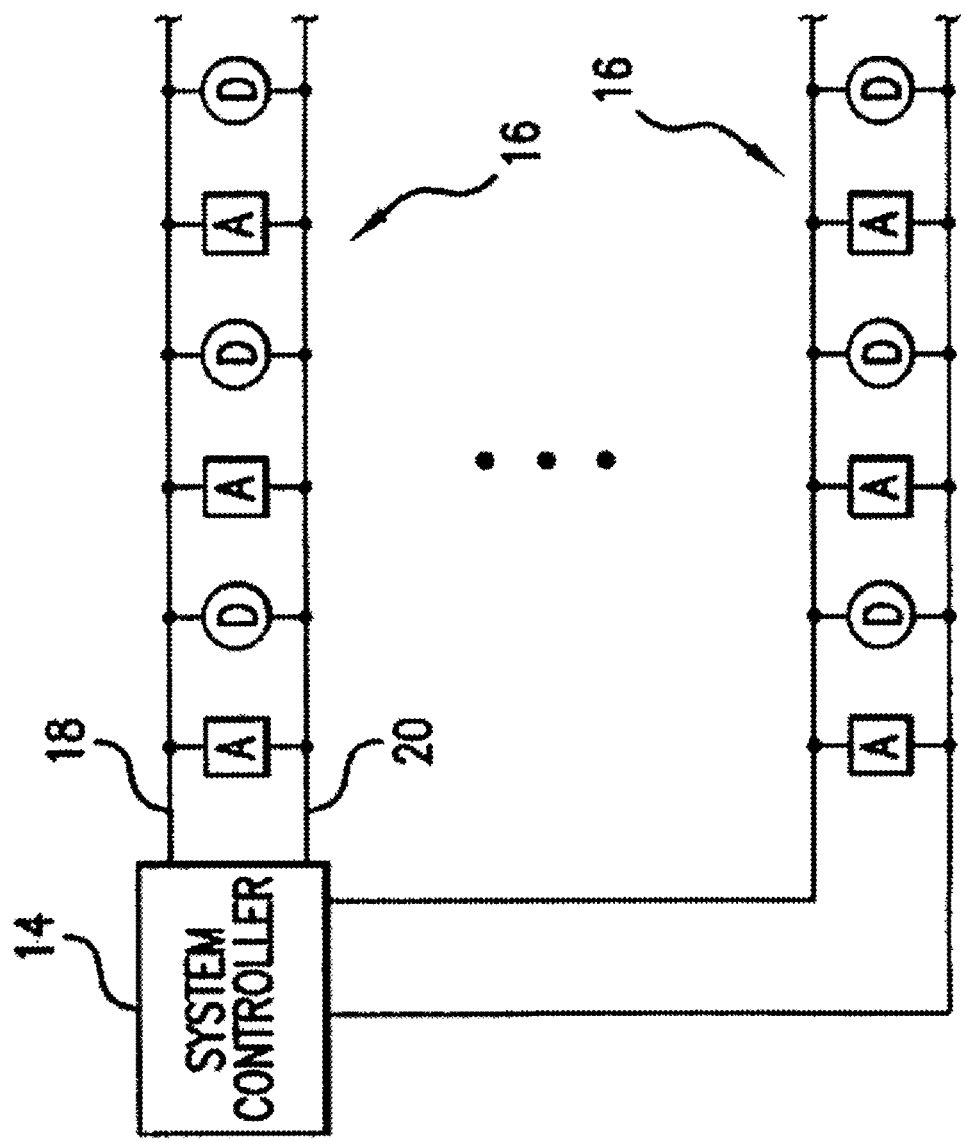
FIG. 1 is a schematic diagram illustrating a fire alarm system.

A notification appliance may be used to notify occupants in a space, such as a building, of a fire or other emergency condition. The notification appliance may use visual (e.g., strobe), audible (e.g., speaker), or a combination of visual/audible outputs to notify the occupants of the fire or other emergency condition.

One type of notification appliance that uses a visual output is a strobe notification appliance. The strobe notification appliance controls a light output element to strobe at a predetermined frequency. As discussed in more detail below, two types of strobe notification appliance are: (1) a flash tube strobe notification appliance; and (2) an LED-based strobe notification appliance. In each type, the strobe notification appliance controls the light output element (either flash tube or LED) to generate the strobed light output at a predetermined frequency, thereby notifying the occupants.

Fire or other emergency conditions may likewise necessitate providing guidance to the occupants as to where to go. In the example of a fire condition, the occupants of the building may need to exit. One way to provide exit information relies upon required static drawings or other instructions posted in common areas to inform building occupants of primary and alternate means of egress from the building. It is commonly expected that building occupants will take notice and review the information provided on these "evacuation plans" in order to be prepared for an orderly evacuation if necessary. Required exit signs are also deployed in an effort at assisting building occupants in locating appropriate exits to egress the building.

However, these static plans as well as the commonly used appliances for providing notification have no means of providing information to building occupants in the event that a path of egress has been compromised, or some other action should be taken by the building occupants. In particular, the fire may result in certain exit paths out of the building being unavailable and certain exit paths preferred. In the example of an emergency condition (such as a hostile intruder or a weather emergency), it may be advisable to instruct the occupants of the building to remain in place. One way to notify occupants where to go is to output an audio warning. This is not a preferable way to notify for the hearing-impaired. Thus, in one embodiment, the strobe notification appliance may notify the occupants of the fire or other emergency condition and likewise provide directional information.

In the fire condition example, the strobe notification appliance may generate, in addition to notification of the fire condition, directional information (e.g., such as away from the unavailable exit paths and/or toward the preferred exit paths). In the emergency condition example, the strobe notification appliance may generate, in addition to notification of the fire condition, directional information (e.g., to shelter in place or to move to a different location).

Figure 7A:
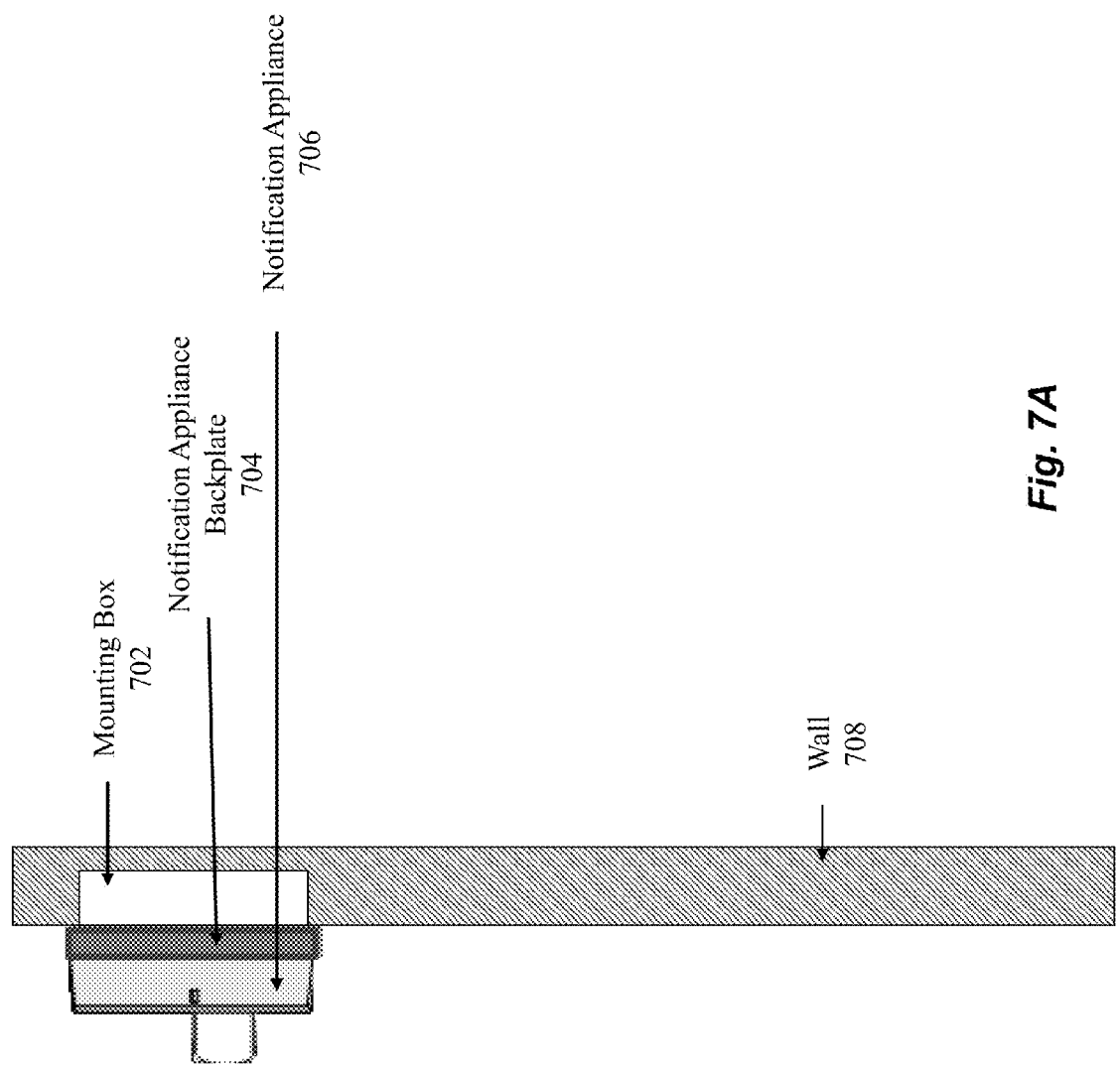
FIG. 7A is a side view of the strobe notification appliance mounted to the wall.
Figure 7B:
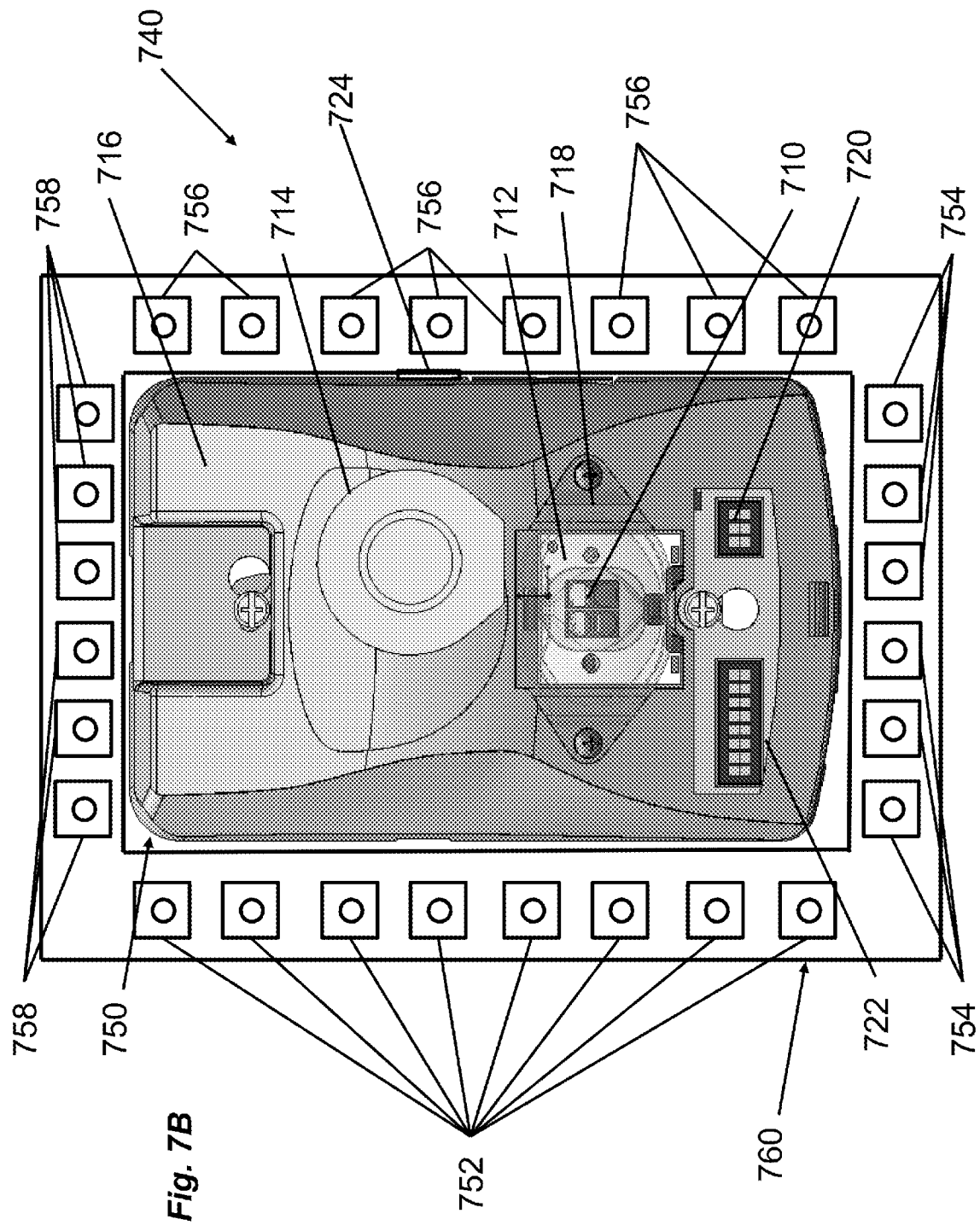
FIG. 7B is a front view of the strobe notification appliance.

In one embodiment, the strobe notification appliance is configured to output the direction information separate from the notification of the fire or emergency condition. In a first more specific embodiment, the strobe notification appliance includes a first visual output configured to output the directional information, and a second visual output configured to output the notification of the fire or emergency condition. For example, the first visual output may include one or more light emitting diodes (LEDs) and the second visual output may include one or more strobe elements (such as a flash tube strobe element or an LED strobe element). The LED(s) may output the directional information in one of several ways. In one way, the LED(s) may output one or more colors to indicate the directional information. In this regard, in one embodiment, single color LEDs may be used. In an alternate embodiment, multi-color LEDs may be used. In particular, outputting the color green on the LED(s) may indicate that a path is recommended, whereas outputting the color red on the LED(s) may indicate that a path is not recommended. Similarly, outputting the color yellow on the LED(s) may indicate that the occupant should stay-in-place. Thus, in response to receiving a command to activate (with the command including directional information), the strobe notification appliance commands the strobe element(s) to generate a strobe output and commands the LED(s) to output the directional information, as discussed in more detail below. In another way, the LED(s) may flash at different rates to indicate the directional information. For example, to convey a recommended direction, the LED(s) may flash at a first rate, and to convey a disallowed direction, the LED(s) may flash at a second rate (with the first rate being different from the second rate). In still another way, the LED(s) may flash at different rates and at a particular color to indicate the directional information. In still another way, certain LED(s) may be lit and other LED(s) may be unlit to convey direction. As one example, the LED(s) may be formed into arrows, with one set of LEDs in the form of a left arrow and a second set of LEDs in the form of a right arrow. The notification appliance may lite the left arrow of LEDs to indicate the recommended direction is left, and may lite the right arrow of LEDs to indicate the recommended direction is right. As another example, the LEDs may be positioned on a right side of the notification appliance and a left side of the notification appliance (such as illustrated in FIG. 7B). In this configuration, the notification appliance may lite the LEDs on the left to indicate the recommended direction is left, and may lite the LEDs on the right to indicate the recommended direction is right.

In a second more specific embodiment, the strobe notification appliance includes a visual output configured to output the notification of the fire or emergency condition (e.g., a strobe element) and a second appliance includes a visual output configured to output the directional information. For example, the second appliance may comprise an exit sign whose light may be controlled to indicate whether to use the exit or not. In particular, the exit sign may be lit when it is recommended to use the exit proximate to the exit sign, whereas the exit sign may be unlit when it is not recommended to use the exit proximate to the exit sign.

In an alternate embodiment, the strobe is configured to output the direction information in conjunction with the notification of the fire or emergency condition. In a first more specific embodiment, the operation of the strobe element (flash tube or LED) is modified, independent of operation of strobe elements on other notification appliances, to convey the directional information. In one example, the frequency of output of light by the strobe element may be modified to convey the directional information. In particular, the frequency may be increased (or decreased) depending on whether to indicate to an occupant of the building to use (or to avoid) a path. In another example, the intensity of the light output may be modified to convey directional information. In particular, the intensity of the light output may be increased to be greater than the candela rating of the strobe notification appliance in order to indicate to an occupant of the building to use a path.

In a second more specific embodiment, the operation of the strobe element (flash tube or LED) is modified, dependent on operation of strobe elements on other notification appliances, to convey the directional information. In one example, the timing of activation of the strobe elements in the different notification appliances is selected to convey directional information. In particular, a series of notification appliances may be along a corridor to an exit. The start of activation of the strobe elements in the series of notification appliances may be timed such as to give a cascading effect toward the exit. In a more specific example, three notification appliances may be positioned in a corridor that has an exit, with the first notification appliance furthest from the exit, the second notification appliance closer to the exit, and the third notification appliance closest to the exit. The activation of the strobe elements on the first, second and third notification appliances may be timed such that the strobe element on the first notification appliance is activated first (e.g., at time t=X seconds), the strobe element on the second notification appliance is activated second (e.g., at time t=X+1 second), and the strobe element on the third notification appliance is activated third (e.g., at time t=X+2 second). In the example of the strobe elements on each of the first, second, and third notification appliances being activated for the same pulse width (e.g., 10 mS or 20 mS in a 1 second cycle), the occupant viewing the cascading activation of the strobe elements may be guided toward the exit. Likewise, the activation of the strobe elements on the first, second and third notification appliances may be timed such that the strobe element on the third notification appliance is activated first (e.g., at time t=X seconds), the strobe element on the second notification appliance is activated second (e.g., at time t=X+1 second), and the strobe element on the first notification appliance is activated third (e.g., at time t=X+2 second), thereby giving the effect of guiding the occupant away from the exit.

The strobe notification appliances may be notified when to activate the strobe element in one of several ways. In one embodiment, the fire alarm panel may send the activation command with the timing information included. For example, the command may include fields correlating the notification appliance's address with the timing information. In the example above, the first notification appliance may be assigned address 0001, the second notification appliance may be assigned address 0002, and the third notification appliance may be assigned address 0003. The fire alarm panel may generate a command that includes the following information correlated to the addresses: 0001:0; 0002:1.0; 0003:2.0. In this regard, a respective strobe notification appliance may access its address (stored locally within the respective strobe notification appliance), and determine the timing information. In an alternative embodiment, the fire alarm panel may cascade the sending the activation command according to the timing information. For example, the fire alarm panel may broadcast a first command (with the address for the first notification appliance and indicative to activate the strobe element) at time t=X, may broadcast a second command (with the address for the second notification appliance and indicative to activate the strobe element) at time t=X+1 second, and may broadcast a third command (with the address for the third notification appliance and indicative to activate the strobe element) at time t=X+2 second. In practice, the respective notification appliance may receive the broadcast commands, determine whether the command includes the address of the respective notification appliance, and activate the strobe in response to determining that an activation command is addressed to it. In this way, staggering the sending of the commands may likewise stagger the timing of the activation of the strobe elements.

A system embodying one example of the present invention is illustrated in FIG. 1. The system in FIG. 1 is directed to a fire alarm system. Notification appliances in an emergency notification system may likewise be used. The system includes one or more notification appliance circuits (NACs), i.e., networks 16, having alarm condition detectors D and alarm system notification appliance A. Alternatively, the detectors and notification appliances may be on separate networks. A system controller (such as a fire alarm control panel (FACP)) 14 may monitor the detectors D.

The system controller 14 may monitor the alarm condition detectors D. When an alarm condition is sensed, the system controller 14 may signal the alarm to the appropriate notification appliances A through the one or more appliance circuits. Notification appliances may include, for example, a visual alarm (such as a strobe), an audible alarm (such as a horn), or a combination thereof.

Although not necessary for carrying out the invention, as shown, all of the notification appliances in a network are coupled across a pair of power lines 18 and 20 that advantageously also carry communications between the system controller 14 and the detectors D and notification appliances A.

The system controller 14 may comprise a fire alarm control panel and may use one or more commands to signal the alarm to the appropriate notification appliances A. Examples of commands issued for a system with addressable notification appliances are disclosed in U.S. Pat. No. 6,426,697, which is hereby incorporated by reference in its entirety. Alternatively, the communication line to the device may be separate from the power line. In still an alternative embodiment, the system may include non-addressable notification appliances. The communications channel may comprise, for example, a wireless link, a wired link or a fiber optic link.

Further, the system controller 14 may send one or more commands relating to diagnostics, status, or other non-alarm type events. For example the system controller 14 may send a command related to the identification, the configuration, and/or the status of the notification appliances A. Moreover, the notification appliances A may respond in kind.

One, some, or all of the notification appliances A may comprise a strobe notification appliance. The strobe notification appliance may be an addressable strobe notification appliance (e.g., the strobe notification appliance has a uniquely assigned address) or a non-addressable strobe notification appliance. Further, in one embodiment, the strobe notification appliance may operate in one of multiple modes, such as a first mode and a second mode. In one implementation, the first mode is different from the second mode in one or more ways. Examples of differences in the modes include, without limitation: timing of activation of the strobe element; duration of activation of the strobe element; intensity of activation of the strobe element; and frequency of activation of the strobe element.

As discussed in more detail below, the fire alarm control panel may send a command to one or more strobe notification appliances to active the strobe element associated with the strobe notification appliance.

Figure 2A:
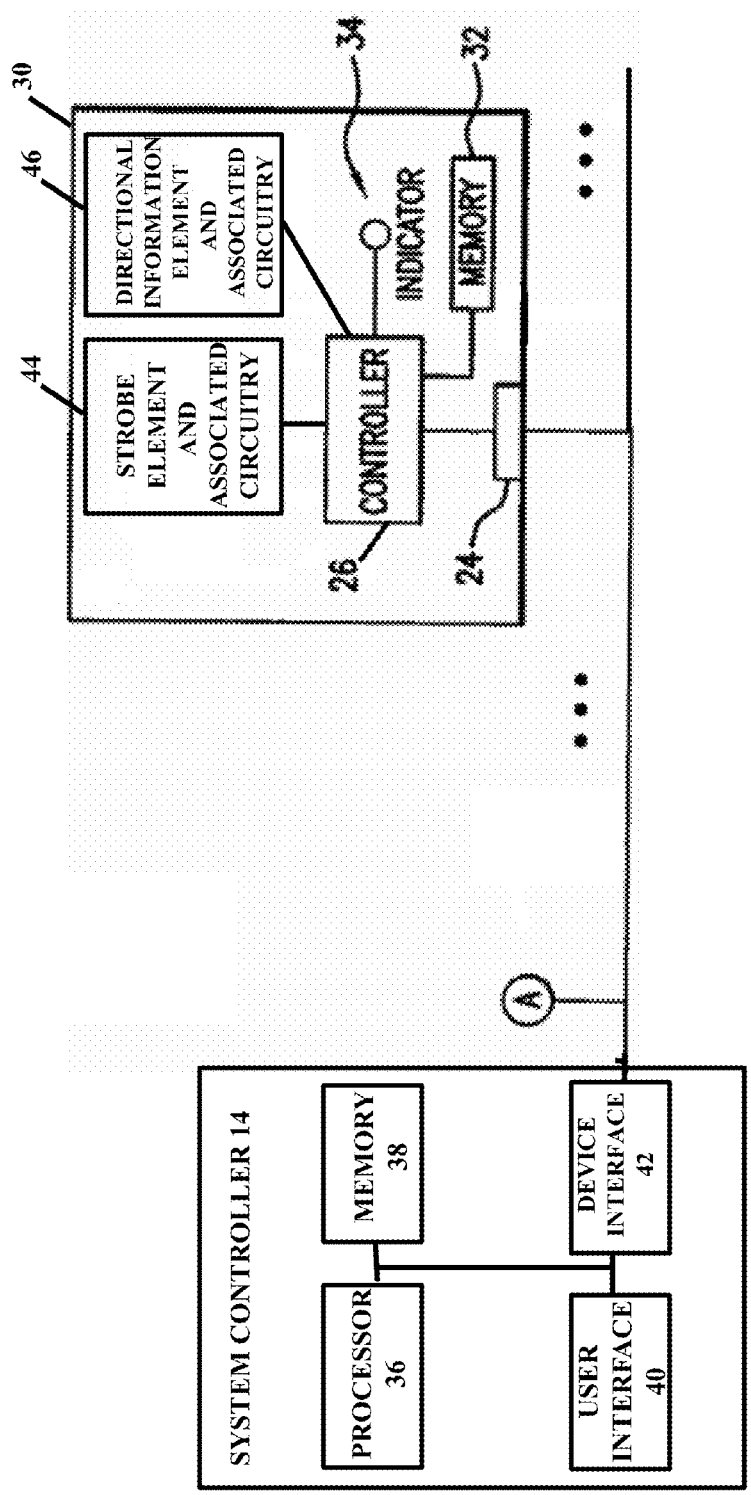
FIG. 2A is a schematic diagram of the system of FIG. 1, further illustrating details of a system controller and a strobe notification appliance with a strobe element and a separate directional information element.

FIG. 2A is a schematic diagram of the system of FIG. 1, further illustrating details of a system controller 14 and a strobe notification appliance with a strobe element and a separate directional information element. The system controller 14 includes a processor 36, a memory 38, a user interface 40, and a device interface 42. The processor 36 may comprise a microprocessor, a microcontroller, a digital signal processor, an application specific integrated circuit (ASIC), a field programmable gate array, a logical digital circuit, or other now known or later developed logical processing capability. The processor 36 may work in combination with the memory 38 in order to monitor part or all of the fire alarm system, including one or more of the appliance circuits (such as one or more notification appliance circuits, one or more detector circuits, and/or one or more notification appliance/detector circuits). In addition, the memory 38 may include one or more look-up tables (or other data structures) used for configuration.

User interface 40 may be used by an operator to control configuration and/or operation of the alarm condition detectors D and alarm system notification appliances A. Further, device interface 42 comprises a communications interface between the system controller 14 and the alarm condition detectors D and alarm system notification appliances A in the one or more appliance circuits.

FIG. 2A further depicts a strobe notification appliance 30 in greater detail. The strobe notification appliance 30 connects to the network 16 via a network interface (communication connection) 24. The strobe notification appliance 30 receives one or more commands from the system controller 14. The controller 26 processes the one or more commands, as discussed in more detail below. Although shown separately, the memory 32 may be integrated with the controller 26.

The strobe notification appliance 30 further includes strobe element and associated circuitry 44. The strobe element may comprise a clear or an amber or otherwise colored strobe element. In one embodiment, the strobe element is a flash-tube based strobe element (also called a flash lamp strobe element). Typically, the flash tube is an electric glow discharge lamp designed to produce extremely intense, incoherent, full-spectrum white light for very short durations. Flash tubes are made of a length of glass tubing with electrodes at either end and are filled with a gas that, when triggered, ionizes and conducts a high voltage pulse to produce the light. One example of the gas that can fill the flash tube is xenon, with a xenon flash tube producing a high-intensity light (such as thousands of lumens) for a very short duration pulse (such as hundreds of microseconds). Xenon flash tubes use a high voltage storage element, such as an electrolytic capacitor, that can be charged several hundred volts to provide energy for the flash. Xenon flash tubes also use a trigger voltage that is in the several thousand volt range to start the gas discharge.

In an alternate embodiment, the strobe element is a Light Emitting Diode (LED)-based strobe element. Typically, an LED-based strobe cannot generate light at as high of an intensity as a Xenon-based strobe. Instead, LED-based strobes generate a lower intensity light (such as hundreds of lumens) for a longer period of time (such as tens to hundreds of milliseconds). In this way, the LED-based strobes can generate a comparable amount of light energy, as measured in candela, as a Xenon-based strobe. Further, an LED-based strobe is a semiconductor device that can be run off a lower voltage than a Xenon-based strobe, thus eliminating the high voltage circuitry. A capacitor may still be used for energy storage in the LED-based strobe, albeit for a lower output voltage. Because of its physical characteristics, an LED-based strobe can be turned on either continuously or pulsed. Factors that may limit the light output of the LED-based strobe are junction temperature and luminosity versus current, as determined by the LED chip materials and bonding wires. Finally, in contrast to flash-tube based strobes, LED-based strobes typically have a longer usable lifetime.

The strobe notification appliance 30 also includes directional informational element and associated circuitry 46. In one embodiment, the controller 26 is configured to activate the strobe element at least partly simultaneously with the directional information element, as discussed in more detail below.

One example of a directional informational element is an LED (or a series of LEDs) separate from the strobe element. In the example of an LED-based strobe element, the LED (or a series of LEDs) may differ from the LED-based strobe element in one of multiple ways. In one way, the LED (or a series of LEDs) may differ from the LED-based strobe element in composition. For example, the LED (or a series of LEDs) may comprise low-power LEDs (e.g., low current LEDs) whereas the LED-based strobe element may comprise high-power LED(s) (e.g., high current LEDs). For example, the LEDs configured to convey directional information may operate at a lower current than the LEDs configured to operate as the strobe element of the notification appliance. In another way, the LED (or a series of LEDs) may differ from the LED-based strobe element in operation. For example, the LED (or a series of LEDs) may be operated to be constantly on when activated whereas the LED-based strobe element may be operated to be strobed when activated. Thus, in operation, the LED-based strobe element may be turned on for a fraction of each second (e.g., 20 mS) whereas the LED (or a series of LEDs) may be on for longer intervals (such as constantly on or flashing for durations longer than 20 mS), so that both the LED-based strobe and the LED (or a series of LEDs) are on simultaneously for that fraction of each second (e.g., only 20 mS per second). One example of the directional LEDs comprise organic light-emitting diodes (OLEDs).

In some embodiments, an indicator 34, such as a flashing LED (separate from the strobe element and associated circuitry 44, and separate from the directional information element and associated circuitry 46), may be used as an output, for example during diagnostic testing, on the strobe notification appliance 30. The indicator 34 may be activated, for example, upon command from the system controller 14, upon a local manual command such as a pushbutton (not shown). Alternatively, the directional information element may be used during diagnostic testing. For example, one or more of the directional LEDs may be used during diagnostic testing. In this regard, the one or more of the directional LEDs may serve multiple purposes.

As discussed above, the strobe notification appliance 30 includes directional informational element and associated circuitry 46. In one embodiment, directional informational element and associated circuitry 46 may be integral with other functionality in strobe notification appliance 30. In this regard, the system controller 14 may use the same address when controlling both the strobe element and the directional information element. In an alternate embodiment, directional informational element and associated circuitry 46 may be a modular add-on for an existing addressable strobe notification appliance. In particular, the directional informational element and associated circuitry 46 may be a retrofit for an existing strobe notification appliance, as discussed in more detail with regard to FIGS. 7A-B. As discussed in more detail below, the directional information element may comprise one or more LEDs. The one or more LEDs may be multi-color LEDs. For example, the multi-color LEDs may be configured to output green color, red color, etc. Alternatively, the one or more LEDs may be single color LEDs. For example, the one or more LEDs may comprise a first set of LEDs of a first single color (e.g., red LEDs), a second set of LEDs of a second single color (e.g., green LEDs), a third set of LEDs of a third single color (e.g., yellow LEDs), etc. In one embodiment, only a single set of LEDs is activated as a single time (e.g., only the red LEDs are activated). In an alternate embodiment, multiple sets of LEDs may be activated simultaneously. As discussed below with respect to FIG. 7B, a first color (e.g., red) may be activated on the left side of the notification appliance while a second color (e.g., green) may be activated on the right side of the notification appliance. In this way, occupants may be notified to exit to the right.

In one embodiment, the retrofitted strobe notification appliance (including the strobe element and the directional informational element) may use a single address. Thus, when sending commands, the system controller 14 may use the same address when controlling both the strobe element and the directional information element. In an alternate embodiment, the retrofitted strobe notification appliance may use separate addresses, one address for controlling the strobe element and a different address for controlling the directional informational element.

Further, in one embodiment, the strobe element and associated circuitry 44 may be on a separate printed circuit board than the directional information element and associated circuitry 46. In particular, the separate printed circuit boards may reduce electrical interaction between the strobe element and associated circuitry 44 and directional information element and associated circuitry 46. In an alternative embodiment, the strobe element and associated circuitry 44 and directional information element and associated circuitry 46 may be on a single printed circuit board.

Figure 2B:
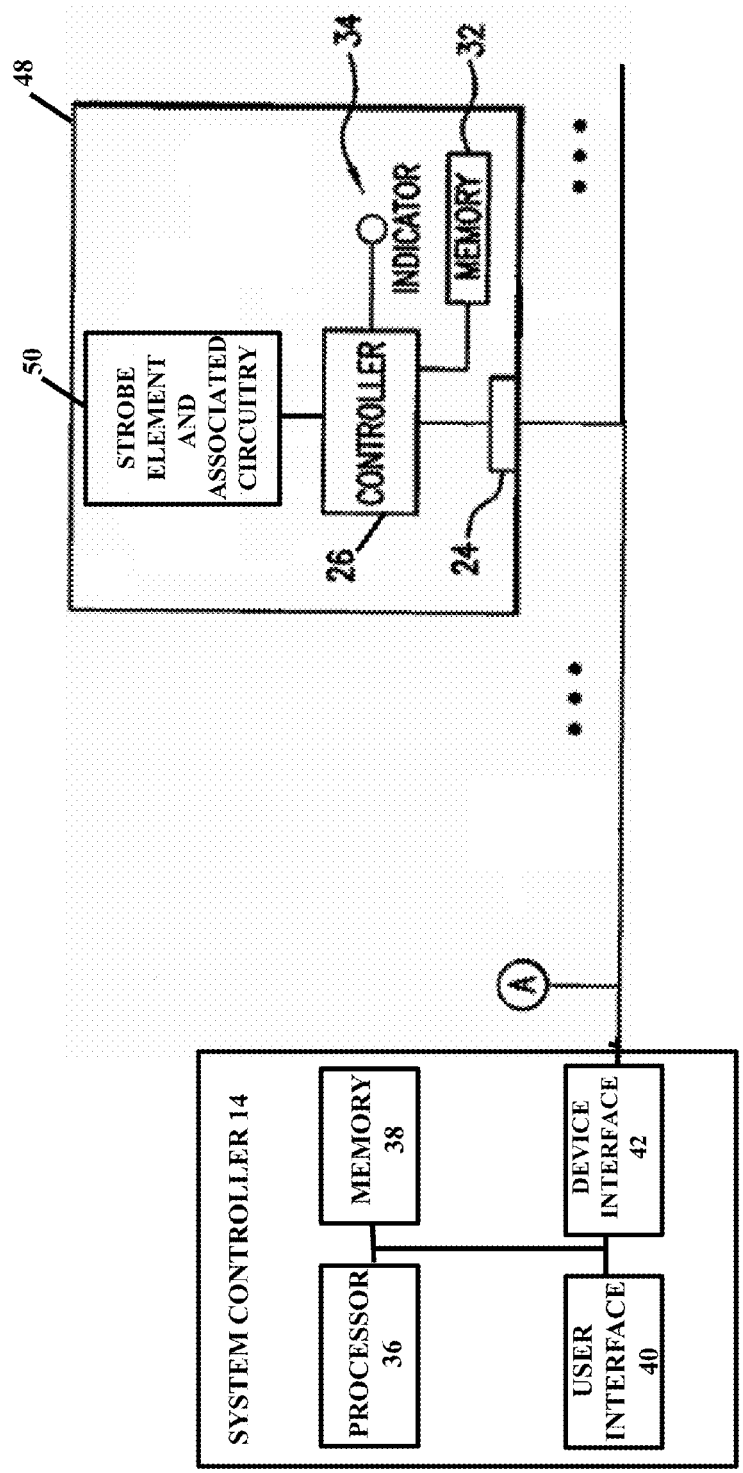
FIG. 2B is a schematic diagram of the system of FIG. 1, further illustrating details of a system controller and a strobe notification appliance with a strobe element that generates a strobe output and directional information.

FIG. 2B is a schematic diagram of the system of FIG. 1, further illustrating details of a system controller 14 and a strobe notification appliance 48 with a strobe element that generates a strobe output and directional information. The strobe notification appliance 48 includes strobe element and associated circuitry 50. In one embodiment, the strobe element is a flash-tube based strobe element. In an alternate embodiment, the strobe element is an LED-based strobe element. The strobe element and associated circuitry 50 is configured to output both notification information and directional information. In particular, the control of the strobe element may be adjusted in order to output both the notification information and the directional information, as discussed in more detail below.

Figure 3A:
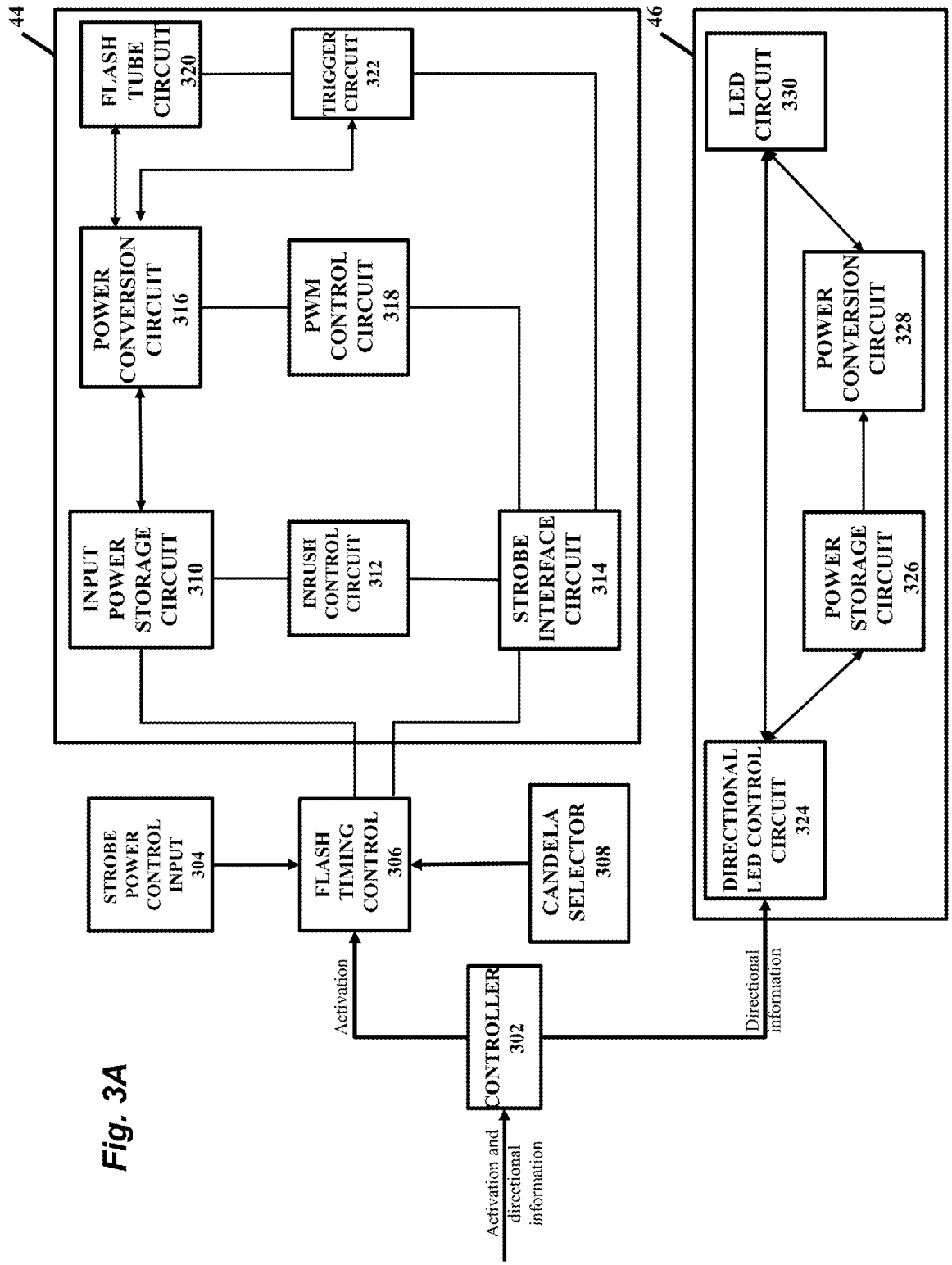
FIG. 3A illustrates one example of an expanded block diagram of the strobe notification appliance (including a flash tube strobe element and associated circuitry, and directional information element and associated circuitry) illustrated in FIG. 2A.

FIG. 3A illustrates one example of an expanded block diagram of the strobe notification appliance (including a flash tube strobe element and associated circuitry, and directional information element and associated circuitry) illustrated in FIG. 2A. In one embodiment, the strobe notification appliance 30 receives a command that includes activation and directional information. Alternatively, the strobe notification appliance 30 receives the activation and directional information in separate communications.

As illustrated in FIG. 3A, the controller 302 receives the activation and directional information. The controller 302 may parse the received information, and send control signals to other parts of the circuitry depicted in FIG. 3A. In one embodiment, the controller 302 may send the activation information and the directional information to parts of the circuitry, such as depicted in FIG. 3A. Alternatively, the controller 302 may send control signals based on the activation information and the directional information.

The strobe power control input 304 is configured to receive power to power the strobe notification appliance 30. Flash timing control 306 is configured to control the timing of the flashes of the strobe element (or strobe elements). The flash timing control 306 may receive as an input the candela selector 308, which may be an input device on the strobe notification appliance 30 (such as a multi-position switch). An example of the switch is disclosed in U.S. Pat. No. 7,456,585, incorporated by reference herein in its entirety. Examples of candela settings include 15, 30, 75, and 110. Alternatively, the candela setting may be pre-programmed and stored in memory 32. In still an alternate implementation, the candela setting may be sent from the fire alarm panel (e.g., system controller 14) to the notification appliance 30. Based on the candela setting, the flash timing control 306 may control the strobe element and associated circuitry 44 to generate an output with the desired candela setting.

As discussed above, one type of strobe element is a flash-tube strobe element, such as discussed in U.S. Pat. No. 8,368,528, incorporated by reference herein in its entirety. The strobe element and associated circuitry 44 includes a strobe interface circuit 314, input power storage circuitry 310, a power conversion circuit 316, a flash circuit 320, inrush control circuit 312, pulse width modulation (PWM) control circuit 318, and a trigger circuit 322.

The input power storage circuitry 310, power conversion circuit 316, flash tube circuit 320, and trigger circuit 322 cooperate to produce a voltage signal with an intensity great enough to energize a flash. For example, the input power storage circuit 310 may correspond to a capacitor or other storage device for storing energy. An inrush control circuit 312 may control the rate at which the input power storage circuit 310 stores energy to prevent excessive current flow into the strobe element and associated circuitry 44. The power conversion circuit 316 may correspond to a voltage amplification circuit such as a transformer based circuit. For example, a DC-to-AC circuit may convert DC energy transferred from the power conversion circuit 316 to AC voltage. The AC voltage may then be increased via, for example, a step-up transformer, to a voltage great enough to activate a flash such as a xenon flash.

The strobe interface circuit 314 may be in electrical communication with the flash timing control 306. As discussed above, the flash timing control 306 may be utilized to control the behavior of the strobe element and associated circuitry 44. The strobe interface circuit 314 may be utilized to configure the behavior of the power conversion circuit 316 so as to control various characteristics of the strobe, such as the frequency and intensity of the flash. Other characteristics of the strobe element and associated circuitry 44 may be configured via the strobe interface circuit 314.

In some implementations, the strobe interface circuit 314 may include a storage device such as a memory for storing configuration information that controls the characteristics of the strobe element and associated circuitry 44. For example, strobe capability information, such as the maximum lumen capability of the flash or flash usage information, may be stored in the memory and communicated to the processing module. In other implementations, the strobe interface circuit 314 relays configuration information communicated by the processing module to the various other circuits.

FIG. 3A further illustrates that directional information is sent to directional information element and associated circuitry 46. Directional information element and associated circuitry 46 may include directional LED control circuit 324, power storage circuit 326, power conversion circuit 328, and LED circuit 330. Directional LED control circuit 324 may include control circuitry to control various elements in directional information element and associated circuitry 46, such as power storage circuit 326 and LED circuit 330. Power storage circuit 326 is configured to store power, and power conversion circuit 328 is configured to perform power conversion. LED circuit 330 may include one or more LEDs, and may be driven by the directional LED control circuit 324 and supplied with power by power conversion circuit 328.

Figure 3B:
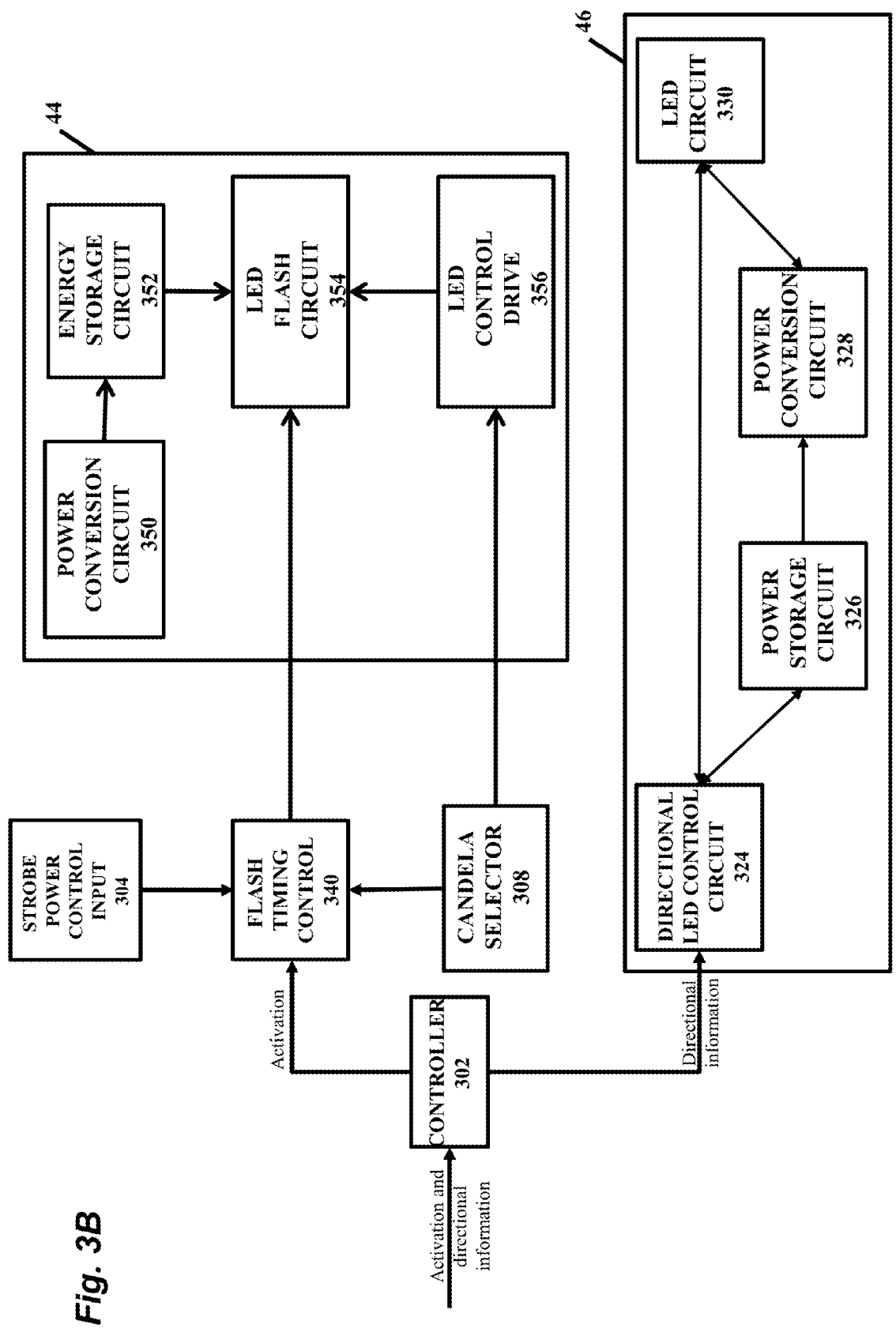
FIG. 3B illustrates another example of an expanded block diagram of the strobe notification appliance (including an LED strobe element and associated circuitry, and directional information element and associated circuitry) illustrated in FIG. 2A.

FIG. 3B illustrates another example of an expanded block diagram of the strobe notification appliance (including an LED strobe element and associated circuitry, and directional information element and associated circuitry 46) illustrated in FIG. 2A. In particular, FIG. 3B includes an LED flash circuit 354, a power conversion circuit 350, energy storage circuit 352, and LED control drive 356. The power conversion circuit 350 provides the proper regulated voltage to the energy storage circuit 352. An example of the power conversion circuit 350 may be a voltage regulator (such as a DC-DC converter or current regulator), and an example of the energy storage circuit 352 may be a capacitor. The flash timing control circuit 340 generates an output to the LED control drive 356. Based on the output, the LED control drive 356 provides the proper current to the LED flash circuit 354 in order for the LED flash circuit 354 to generate the desired intensity. Further, the flash timing control 340 generates an output to LED flash circuit 354, which dictates the duration of the output of the LED flash circuit 354. Thus, the flash timing control 340 may control both the intensity and the duration in order to generate an output with the requested candela rating (as dictated by candela selector 308). The flash timing control 340 further may communicate with the power conversion circuit 350 in order for the power conversion circuit 350 to provide the proper voltage to energy storage circuit 352.

Thus, upon receiving the activation signal (such as in the form of a command received by network interface 24), the power conversion circuit 350 may charge up the storage capacitor in energy storage circuit 352. When the strobe element is activated, the flash timing control 340 may initialize the power conversion circuit 350 to charge the energy storage circuit 352, as well as configure the LED control drive 356. This may be applicable to a notification appliance that is addressable. In a non-addressable notification appliance, the flash timing control may be set directly (such as locally on the non-addressable notification appliance).

Figure 3C:
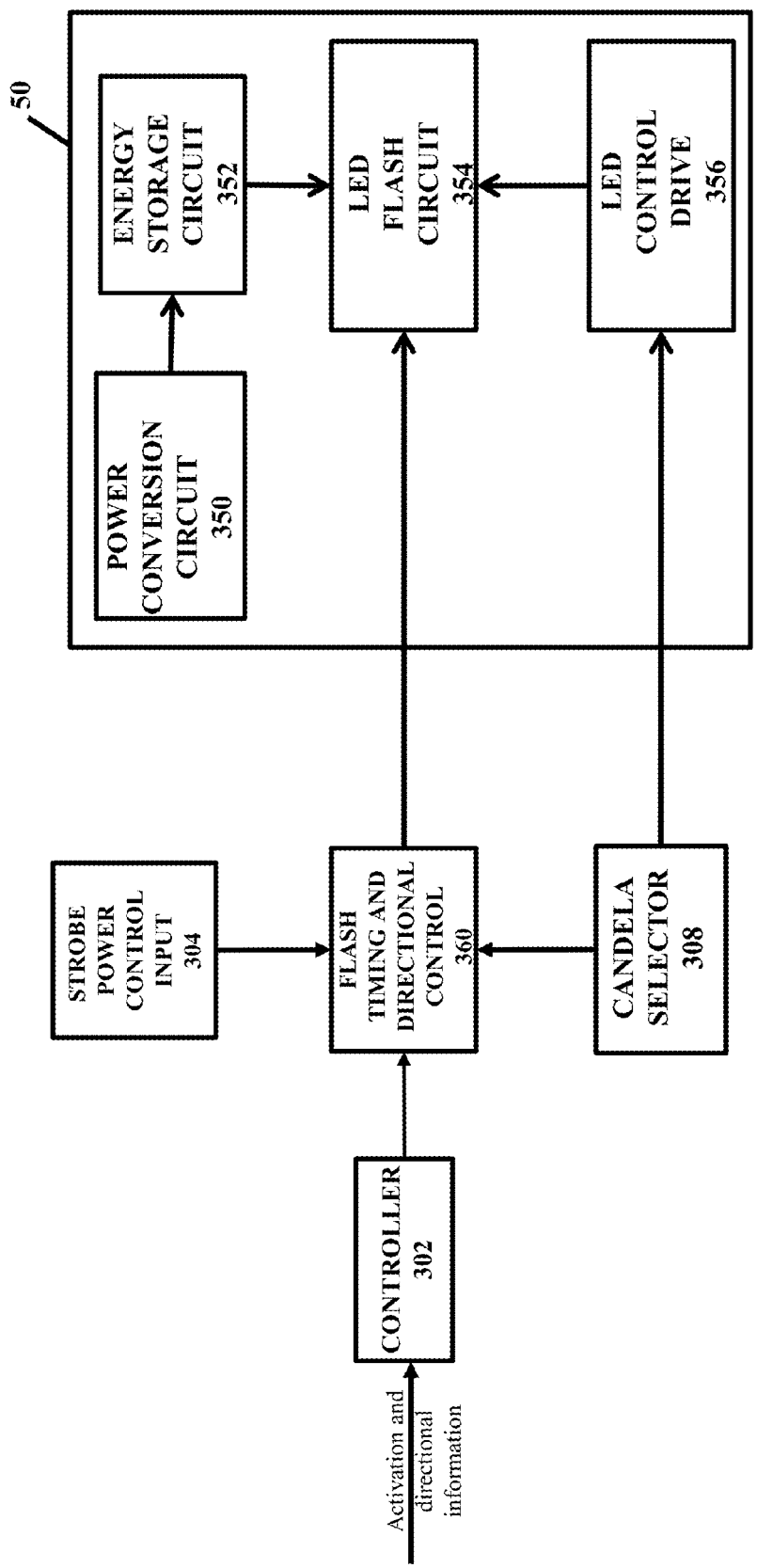
FIG. 3C illustrates one example of an expanded block diagram of the strobe notification appliance (including a strobe element and associated circuitry) illustrated in FIG. 2B.

FIG. 3C illustrates one example of an expanded block diagram of the strobe notification appliance (including a strobe element and associated circuitry) illustrated in FIG. 2B. Notification and directional information may be simultaneously output by the LED strobe element, as discussed above. In this regard, flash timing and directional control circuit 360 is configured to receive one or more signals from controller 302. In response to receipt of the one or more signals, flash timing and directional control circuit 360 controls LED flash circuit 354 in order to output the notification and directional information, as discussed above.

Figure 4:
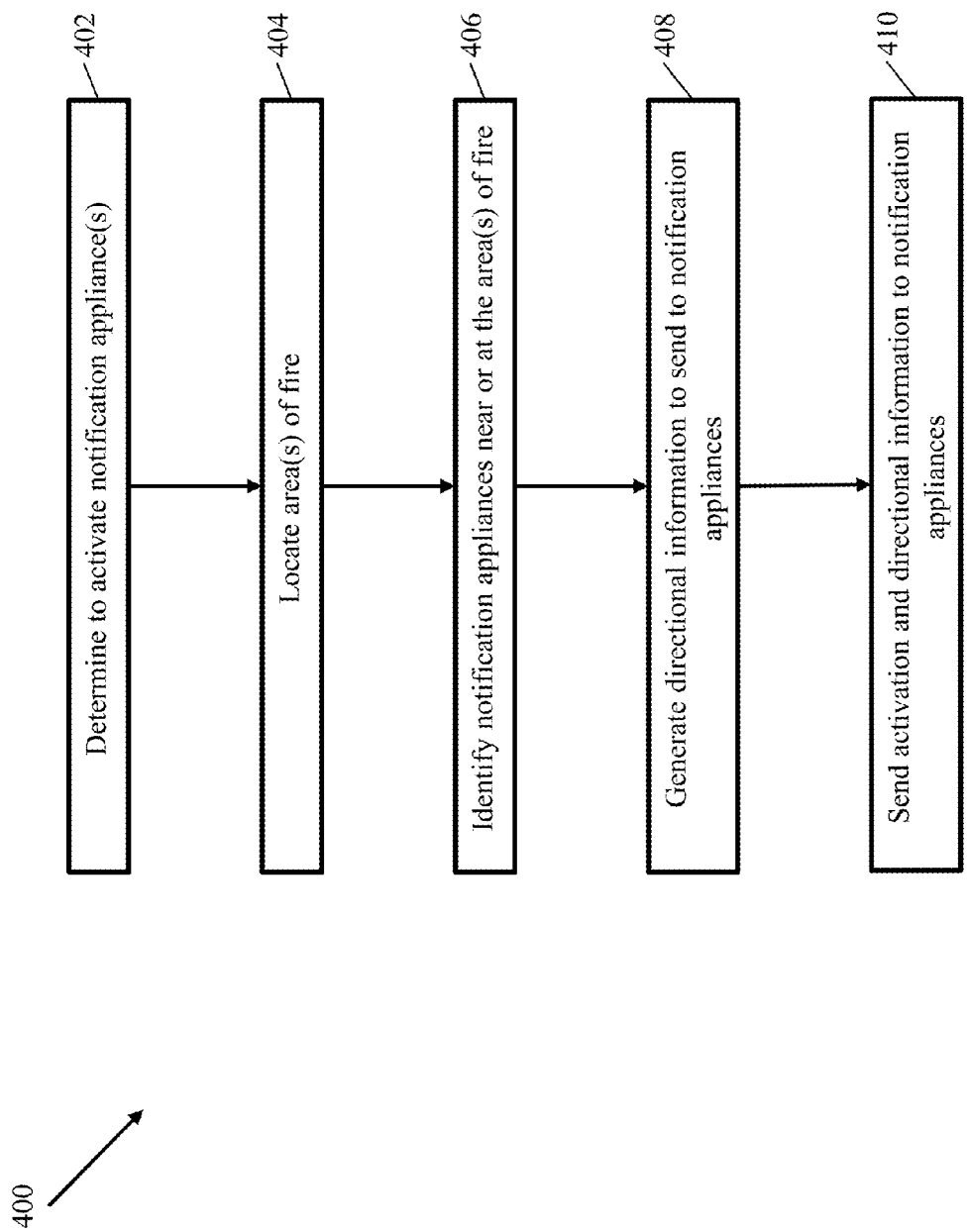
FIG. 4 is an exemplary flow chart of operation of the fire alarm panel in generating and sending the directional information to the strobe notification appliance.

FIG. 4 is an exemplary flow chart 400 of operation of the fire alarm panel in automatically generating and sending the directional information to the strobe notification appliance. At 402, the fire alarm panel determines whether to activate one or more of the notification appliances. As discussed above, the fire alarm panel may receive alarms or events from one or more sensors, such as fire alarm detectors, carbon monoxide detectors, heat sensors, or the like. Based on this information, the fire alarm panel may determine to activate one, some or all of the notification appliances under its control.

At 404, the fire alarm panel may locate the one or more areas of fire in the building. As one example, the fire alarm panel may determine which detectors, such as which fire alarm detectors or heat sensors, indicate areas of fire. At 406, based on the determined area(s) of fire, the fire alarm panel may determine which notification appliances are near or proximate to the determined area(s) of fire.

At 408, based on the identified notification appliances from 406, the fire alarm panel may generate directional information. As discussed above, the directional information may indicate a recommended path, may indicate a path to avoid, and/or may indicate to stay-in-place. In the instance of a fire alarm emergency, in one embodiment, the fire alarm panel may generate directional information to indicate to the occupant recommended path(s) to exit the building. In an alternate embodiment, the fire alarm panel may generate directional information to indicate to the occupant path(s) to avoid when exiting the building. In still an alternate embodiment, the fire alarm panel may generate directional information to indicate to the occupant recommended path(s) to exit the building and to indicate to the occupant path(s) to avoid when exiting the building. As discussed in more detail below, in other emergencies, the fire alarm panel may generate directional information, such as whether the occupant should stay-in-place and/or exit the building.

In one example, determination as to the preferred route(s) or disapproved route(s) may be based upon determined evacuation or other emergency responses for the building. The evacuation routes are known, and the programming for the appliances may be added to "configurable zones" that would indicate if a route was safe or not safe to use. In one particular example, smoke sensors may be associated with different evacuation routes. In response to the fire alarm panel determining that a particular smoke sensor was activated, the associated evacuation route may be deemed unsafe to use.

In another example, zones may be correlated to evacuation routes such that if a zone is in alarm, certain activation routes may be recommended. Programming the correlation may be performed manually, such as through programmed switches (e.g., physical switches or soft keys on a display (labeled for function) that are manually activated at the control panel).

At 410, the fire alarm panel sends the activation and directional information to the notification appliance(s). As discussed above, the activation and directional information may be sent in the same communication, or may be sent in separate communications to the notification appliance(s). Further, the activation and directional information may take several forms.

Alternatively, an authority having jurisdiction (AHJ), such as a firefighter, may provide input to fire alarm panel in order to determine the directional information to send to the notification appliances. The AHJ may thus determine the location of a fire, and based on this information, select directional information for a single notification appliance or for groups of notification appliances. In particular, the AHJ may individually select directional information for one, some, or all of the notification appliances in the system. Alternatively, the AHJ may input directional information that may be applied to a group of notification appliances. For example, when configuring the fire alarm system, the notification appliances may be grouped in virtual notification appliance circuits (VNAC), in which the notification appliances grouped in the VNAC are treated similarly. One example of a VNAC is illustrated in U.S. Pat. No. 8,378,806, incorporated by reference herein in its entirety. Upon the AHJ identifying directional information for a notification appliance (or a group of notification appliances), the fire alarm panel may assign all of the notification appliances in the VNAC similar directional information. In this way, the AHJ may provide manual input in order to determine directional information for groups of notification appliances.

Figure 5:
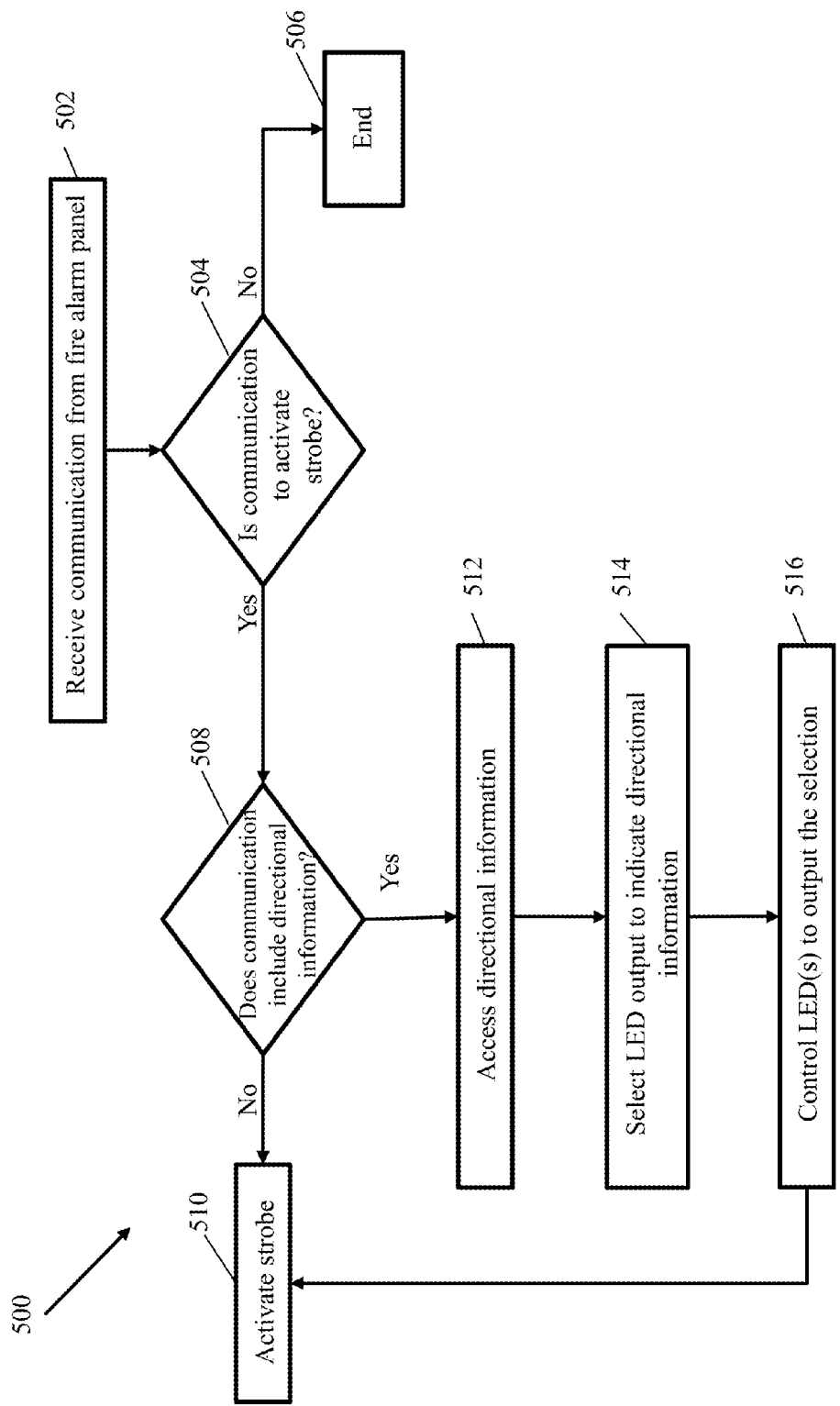
FIG. 5 is a first exemplary flow chart of operation of the fire alarm notification appliance to output the directional information separate from activating the strobe element of the strobe notification appliance.

FIG. 5 is a first exemplary flow chart 500 of operation of the fire alarm notification appliance to output the directional information separate from activating the strobe element of the strobe notification appliance. As discussed above, in one embodiment, the directional information may be output separately from the activation of the strobe element in the fire alarm notification appliance. For example, the fire alarm notification appliance may have two separate light output elements, such as a strobe element and another light output element. As discussed in more detail below with regard to FIG. 7B, the another light output element may comprise one or more LEDs.

At 502, the fire alarm notification appliance receives a communication from the fire alarm panel. At 504, the fire alarm notification appliance determines whether the communication is to activate the strobe element. If not, at 506, flow chart 500 ends. If so, at 508, the fire alarm notification appliance determines whether the communication includes directional information. As discussed above, the communication may include multiple fields, with one field indicative of activation and another field indicative of directional information. In this regard, the fire alarm notification appliance may search the different fields in the communication to determine whether the communication includes an indication to activate the strobe element and includes directional information. If no directional information is included in the communication, at 510, the fire alarm notification appliance activates the strobe element. If directional information is included in the communication, at 512, the fire alarm notification appliance accesses the directional information in the communication. The content of the directional information may be in one of several forms. In one example, the directional information may be indicative of a color to output (e.g., green, red, or yellow). In this regard, at 514, the fire alarm notification appliance may select the LED output to indicate the directional information. In the example of the directional information indicative of color, the fire alarm notification appliance may select the color of the LED to match the color as indicated by the directional information. At 516, the fire alarm notification appliance controls the LED(s) to output the selection. In particular, directional information indicative of red results in the fire alarm notification appliance selecting red to output on the LED. After which, the flow diagram 500 loops to 510.

Figure 6:
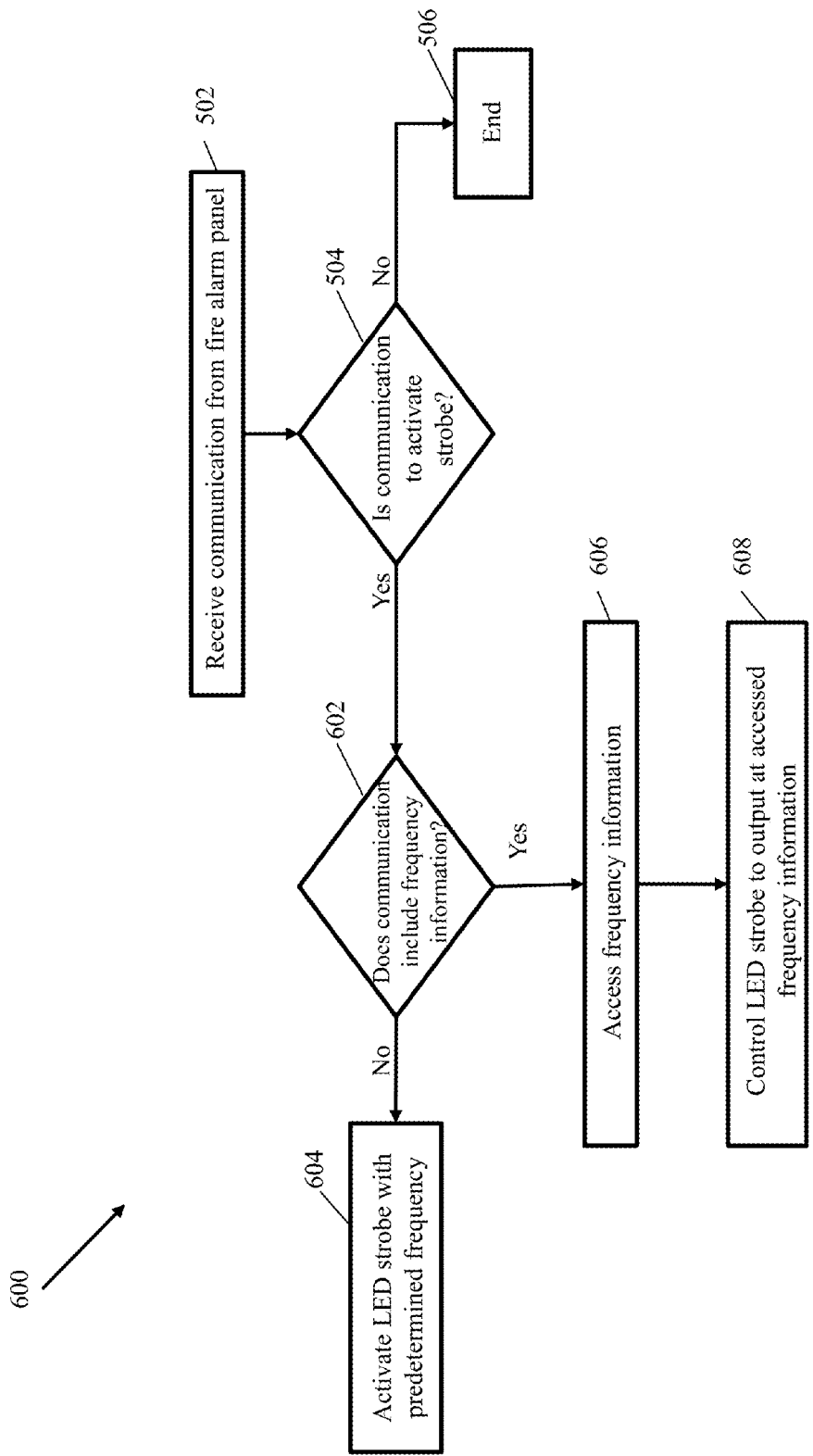
FIG. 6 is a second exemplary flow chart of operation of the fire alarm notification appliance to output the directional information in combination with activating the strobe element of the strobe notification appliance.

FIG. 6 is a second exemplary flow chart 600 of operation of the fire alarm notification appliance to output the directional information in combination with activating the strobe element of the strobe notification appliance. As discussed above, in one embodiment, the directional information may be output in combination with the activation of the strobe element in the fire alarm notification appliance. For example, the fire alarm notification appliance may control a single light output element (such as a strobe) in one or more aspects in order to output both the notification and directional information. Example aspects include frequency of the strobed output, timing of the strobed output, or the like. At 602, the fire alarm notification appliance determines whether the communication includes frequency information. If so, at 606, the fire alarm notification appliance accesses frequency information in the communication, and at 608, controls the LED strobe to output at the accessed frequency information. If not, at 604, the fire alarm notification appliance activates the LED strobe with a predetermined frequency.

As discussed above, various notification appliances may be used. Examples of notification appliances include, but are not limited to: fire alarm notification appliances; emergency notification appliances; and the like. FIG. 7A is a side view of a notification appliance 706 mounted to the wall 708. FIG. 7A further illustrates mounting box 702 and notification appliance backplate 704. The modular add-on appliance may include a backplate (not shown) that is installed on the original notification appliance backplate 704 or replace the original notification appliance backplate 704 before the notification appliance 706 would be mounted. FIG. 7A illustrates a notification appliance with a flash tube strobe element. Alternatively, the strobe element may comprise one or more LEDs, such as illustrated in FIG. 7B. Further, as illustrated in FIG. 7B, the modular add-on appliance backplate may contain one or more colored and/or multicolored indicators.

In one example, the retrofit may comprise an add-on indicator plate. The add-on indicator plate may include an electrical connector configured to electrically connect to one or more contacts on the previously installed notification appliance. In a specific example, the set of contacts may be exposed on an edge of the previously installed notification appliance, thereby allowing the electrical connection of the add-on indicator plate to the addressable signal line circuit within the existing appliance. Further, the add-on indicator plate may include a mechanical connector configured to mechanically connect to the previously installed notification appliance. The mechanical connector may comprise one or more screws to screw through a hole in the add-on indicator plate and affix to the previously installed notification appliance.

FIG. 7B illustrates an exemplary embodiment of the strobe notification appliance 740, which includes original notification appliance 750 and modular add-on appliance backplate 760. The original notification appliance 750 may include front housing 716, optic 718, LEDs 710, LED PCB 712, input devices 720, 722, and speaker 714. The input devices 720, 722 may be manually configurable. For example, the input devices 720, 722 may comprise manual switches (e.g., 2 position switches) in order for a technician to configure the notification appliance. As illustrated in FIG. 7B, the number of switches for input device 720 is different than the number of switches for input device 722. Alternatively, the number of switches for input device 720 may be the same as the number of switches for input device 722. In one embodiment, input device 720 may be for input of the address of the notification appliance, and input device 722 may be for input to configure the audio output, in the event that the notification appliance includes an audio output, such as a horn. In this regard, the controller of the notification appliance may poll both of input device 720, 722 in order to determine the address and the audio configuration of the notification appliance, respectively. Thereafter, the address and the audio configuration of the notification appliance may be stored in a memory within notification appliance and/or may be transmitted external to the notification appliance (e.g., to a fire alarm control panel responsive to a command from the fire alarm control panel querying the notification appliance).

FIG. 7B further illustrates modular add-on appliance backplate 760. Modular add-on appliance backplate 760 (similar to notification appliance backplate 704) may be connected to original notification appliance 750 in one of several ways. In one example, modular add-on appliance backplate 760 is connected to original notification appliance 750 via a plug 724 on the side of original notification appliance 750. Other connections are contemplated.

Modular add-on appliance backplate 760 includes one or more LEDs. FIG. 7B depicts four rows of LEDs, including on the left side of original notification appliance 750 (LEDs 752), on the right side of original notification appliance 750 (LEDs 756), on the bottom side of original notification appliance 750 (LEDs 754), and on the top side of original notification appliance 750 (LEDs 758). In this regard, LEDs 752 and LEDs 756 are on opposite sides of LEDs 710 of notification appliance 750. Similarly, LEDs 754 and LEDs 758 are on opposite sides of LEDs 710 of notification appliance 750. As discussed above, LEDs in 752, 754, 756, 758 may comprise single color LEDs or multi-color LEDs. In using single color LEDs, LEDs in 752, 754, 756, 758 may include different single color LEDs (e.g., red color LEDs, green color LEDs, etc.). Though FIG. 7B illustrates four separate rows of LEDs, other configurations are contemplated. For example, only one row of LEDs may be included (including one of 752,754, 756, 758). Alternatively, only two rows of LEDs may be included (including, for example, 752 and 756, or 754 and 758). In yet another alternative, only three rows of LEDs may be included (including, for example, 752, 754, 756, or 752, 756, 758).

In one embodiment, all of the rows of LEDs 752, 754, 756, 758 output the same color for directional information. For example, in the event that the directional information indicates a clear path in a fire emergency, all of the LEDs in rows 752, 754, 756, 758 are green in color. As another example, in the event that the directional information indicates a blocked path in a fire emergency, all of the LEDs in rows 752, 754, 756, 758 are red in color. In this regard, when an occupant is faced with a first path and a second path, with the first path having notification appliance with LEDs green in color and the second path having notification appliance with LEDs red in color, the occupant may select the first path to exit the building.

In still another example, in the event that the directional information indicates to stay-in-place or shelter in an emergency (such as a hostile intruder, a weather emergency, a bomb threat, or the like), all of the LEDs in rows 752, 754, 756, 758 are yellow in color.

In still another embodiment, the rows of LEDs 752, 754, 756, 758 output different colors to convey different directional information. For example, in the event that the exit to the left is blocked and the exit to the right is clear, the LEDs in row 752 (on the left of the notification appliance 740) output the color red and the LEDs in row 756 (on the right of the notification appliance 740) output the color green. In this way, occupants may be notified to exit to the right.

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A strobe notification appliance for use in an alarm system, the strobe notification appliance comprising:
   a communication interface;
   a first light emitting element configured to output strobing light from a front face of the strobe notification appliance;
   second light emitting elements positioned on opposite sides of the first light emitting element and configured to output light indicative of directional information;
   a cover positioned to cover the first light emitting element, the cover not positioned to cover the second light emitting elements;
   a controller in communication with the communication interface, the first light emitting element, and the second light emitting elements, the controller configured to:
   receive, via the communication interface, a command to activate the strobe notification appliance; and in response to receiving the command:
control the first light emitting element in order for the first light emitting element to output the strobing light; and
control the second light emitting elements in order for the second light emitting elements to output the light indicative of the directional information, the directional information configured to convey at least one of a direction for an occupant to go, a direction for the occupant not to go, or an indication to stay in place,
wherein when the strobing light and the light indicative of directional information is output simultaneously, the light indicative of directional information is visible to an occupant separate from the strobing light.

2. The strobe notification appliance of claim 1, wherein the second light emitting elements comprises one or more LEDs; and
wherein the first light emitting element comprises one or more strobe elements.

3. The strobe notification appliance of claim 2, wherein the one or more strobe elements comprise one or more high current LEDs; and
wherein the one or more LEDs comprise one or more low current LEDs.

4. The strobe notification appliance of claim 1, wherein the second light emitting elements comprise one or more LEDs; and
wherein the one or more LEDs are positioned on the front face of the strobe notification appliance.

5. The strobe notification appliance of claim 1, wherein the second light emitting elements comprise one or more LEDs; and
wherein the one or more LEDs are positioned on the front face of the strobe notification appliance and to a right side, a left side and a bottom side of the one or more strobe elements.

6. The strobe notification appliance of claim 2, wherein the command to activate the strobe notification appliance comprises an indicator of movement in a rightward direction or a leftward direction relative to the strobe notification appliance;
wherein the controller is configured to control the one or more LEDs to convey the directional information by:
determining, based on the indicator, a color for the one or more LEDs, the color indicative of the movement in the rightward direction or the leftward direction relative to the strobe notification appliance; and
controlling the one or more LEDs to output the color.

7. The strobe notification appliance of claim 6, wherein the controller is configured to determine the color indicative of the directional information from a plurality of colors, one of the plurality of colors indicative of not going in the rightward direction or leftward direction and another of the plurality of colors indicative of going in the rightward or leftward direction.

8. The strobe notification appliance of claim 1, wherein the second light emitting elements are positioned on the front face of the strobe notification appliance and are visible to the occupant.

9. The strobe notification appliance of claim 1, wherein the controller is configured to control the second light emitting elements in a first configuration so that the directional information is indicative to the occupant to move in a leftward direction relative to the strobe notification appliance; and wherein the controller is configured to control the second light emitting elements in a second configuration so that the directional information is indicative to the occupant to move in a rightward direction relative to the strobe notification appliance.

10. The strobe notification appliance of claim 1, wherein the second light emitting elements comprise a first LED and a second LED;
wherein light output from the first LED is indicative to the occupant whether to move in a rightward direction relative to the strobe notification appliance; and
wherein light output from the second LED is indicative to the occupant whether to move in a leftward direction relative to the strobe notification appliance.

11. The strobe notification appliance of claim 1, wherein the second light emitting elements comprise a first LED and a second LED;
wherein light output from the first LED is indicative to the occupant whether or not to move in a rightward direction relative to the strobe notification appliance; and
wherein light output from the second LED is indicative to the occupant whether or not to move in a leftward direction relative to the strobe notification appliance.

12. The strobe notification appliance of claim 11, wherein a first color output from the first LED is indicative to the occupant to move in a rightward direction relative to the strobe notification appliance;
wherein a second color output from the first LED is indicative to the occupant not to move in a rightward direction relative to the strobe notification appliance;
wherein a first color output from the second LED is indicative to the occupant to move in a leftward direction relative to the strobe notification appliance; and
wherein a second color output from the second LED is indicative to the occupant not to move in a leftward direction relative to the strobe notification appliance.

13. The strobe notification appliance of claim 1, wherein the second light emitting elements are in a form of an arrow.

14. The strobe notification appliance of claim 13, wherein the arrow is pointing in a direction; and
wherein activation of the second light emitting elements in the form of an arrow is indicative to the occupant to travel in the direction.

15. The strobe notification appliance of claim 1, wherein when the strobing light and the light indicative of directional information is output simultaneously, the light indicative of directional information is visible to an occupant separate from the strobing light, the strobing light comprises white light and the light indicative of directional information comprises non-white light.

16. The strobe notification appliance of claim 1, wherein the directional information is configured to convey the direction for the occupant to go.

17. The strobe notification appliance of claim 1, wherein the directional information is configured to convey the direction for the occupant not to go.

18. The strobe notification appliance of claim 1, wherein the directional information is configured to convey the direction for the occupant to go and the direction for the occupant not to go.

19. The strobe notification appliance of claim 1, wherein the directional information is configured to convey the indication to stay in place.

20. The strobe notification appliance of claim 1, wherein the first light emitting element comprises a flash tube strobe element.

21. A strobe notification appliance for use in an alarm system, the strobe notification appliance comprising:
- a communication interface;
- a first light emitting element configured to output strobing light from a front face of the strobe notification appliance;
- second light emitting elements positioned on opposite sides of the first light emitting element and configured to output light indicative of directional information;
- a controller in communication with the communication interface, the first light emitting element, and the second light emitting elements, the controller configured to:
  - receive, via the communication interface, a command to activate the strobe notification appliance; and
  - in response to receiving the command:
    - control the first light emitting element in order for the first light emitting element to output the strobing light; and
    - control the second light emitting elements in order for the second light emitting element to output the light indicative of directional information, the directional information configured to convey at least one of a direction for an occupant to go, a direction for an occupant not to go, or an indication to stay in place, wherein the control of the first light emitting element and the second light emitting elements is such that the strobing light from the first light emitting element and the light indicative of directional information is output at least partly simultaneously, and wherein when the strobing light and the light indicative of directional information is output simultaneously, the strobing light is visible to an occupant separate from the strobing light.

* * * * *